(12) United States Patent
Johri et al.

(10) Patent No.: US 8,194,847 B2
(45) Date of Patent: Jun. 5, 2012

(54) METHOD AND SYSTEM FOR VOICE MONITORING

(75) Inventors: Priyank Johri, Fort Worth, TX (US);
Parijat Sharma, Irving, TX (US);
Ravinder Pal Singh, Irving, TX (US);
Milosh Boroyevich, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1588 days.

(21) Appl. No.: 11/565,362

(22) Filed: Nov. 30, 2006

(65) Prior Publication Data
US 2008/0130842 A1    Jun. 5, 2008

(51) Int. Cl.
*H04M 3/00* (2006.01)

(52) U.S. Cl. ................... 379/265.01; 379/308

(58) Field of Classification Search ........... 379/88.01, 379/266.01, 265.01–265.04, 265.05, 265.06, 379/308
See application file for complete search history.

(56) References Cited

U.S. PATENT DOCUMENTS

| | | | | |
|---|---|---|---|---|
| 6,108,410 A * | 8/2000 | Reding et al. | ............ | 379/265.03 |
| 7,139,381 B2 * | 11/2006 | McCormack | ............ | 379/207.02 |
| 7,457,404 B1 * | 11/2008 | Hession et al. | ............ | 379/265.07 |
| 7,933,398 B1 * | 4/2011 | Laurinavichus | ............ | 379/265.02 |
| 2002/0106071 A1 * | 8/2002 | Uppaluru et al. | ............ | 379/265.02 |
| 2003/0002642 A1 * | 1/2003 | Jorasch et al. | ............ | 379/201.01 |
| 2004/0098264 A1 * | 5/2004 | Bowater et al. | ............ | 704/270 |
| 2006/0233326 A1 * | 10/2006 | Erhart et al. | ............ | 379/88.16 |

* cited by examiner

*Primary Examiner* — Simon Sing
*Assistant Examiner* — Simon King

(57) ABSTRACT

A system and method may provide processing of a communication request for establishing a communication session to communicate signals between an interactive voice response device and a first communication device over a network, identifying a monitoring request requesting monitoring of the communication session, and instructing establishment of a monitoring session for conferencing a second communication device into the communication session to receive the signals communicated between the interactive voice response device and the first communication device at the second communication device.

20 Claims, 6 Drawing Sheets

200

| Monitoring Request No. 202 | Address Information 204 | Monitoring Events 206 |
|---|---|---|
| 1 | Called telephone number | Voice amplitude |
| 2 | Network Address | Circular Sequence of Questions |
| 3 | Calling telephone number | Number of Questions |

FIG. 2

METHOD AND SYSTEM FOR VOICE MONITORING

BACKGROUND INFORMATION

Effective and clear communication is important for companies responding to the needs of their customers. Customers often use the telephone to call a company for ordering a service or for requesting assistance with a problem. Employing human customer service agents to respond to customer needs, however, is expensive and companies seek to reduce these costs by using voice response systems. Voice response systems may answer some questions of the customer, and may not require speaking with a customer service agent, thus lowering costs. If unable to help the customer, the voice response system may transfer the call to a customer service agent.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

FIG. 2 illustrates an exemplary table stored in a database for determining whether address information is associated with a monitoring request or a monitoring event, according to an exemplary embodiment of the present invention.

DETAILED DESCRIPTION OF EXEMPLARY EMBODIMENTS

A system and process of an exemplary embodiment of the present invention provides for processing a communication request including address information to establish a communication session between an interactive voice response unit and a first communication device over a network, and for determining whether the address information is associated with a monitoring request. The system and process of an exemplary embodiment of the present invention may further provide for requesting establishment of a monitoring session to conference a second communication device into the communication session if the address information is associated with the monitoring request. Additionally, the system and process of an exemplary embodiment of the present invention may provide for identifying a monitoring event based on signals communicated in the communication session, and establishing a monitoring session for conferencing a second communication device into the communication session to receive the signals communicated between the first communication device and an interactive voice response unit using the communication session.

Effective assistance of customers may involve analyzing a customer's interaction with an interactive voice response unit during a phone call. Oftentimes, customers may be unwilling to provide feedback due to their frustration caused by the interactive voice response unit. A supervisor may listen into the call with the customer after the call is transferred to a customer service agent. Conventional systems, however, do not permit a supervisor to monitor the call as a customer interacts with the interactive voice response unit. Exemplary embodiments of the present invention may permit conferencing a supervisor workstation into a communication session between an interactive voice response unit (IVRU) and the customer for monitoring and identifying problems occurring in the customer's interaction with the interactive voice response unit. Exemplary embodiments of the present invention also may permit a supervisor to monitor the call from cradle to grave (e.g., beginning with monitoring of the session between the customer and the IVRU and subsequently continuing the same monitoring session in a scenario where the customer is transferred to a customer service agent).

Figure 1:
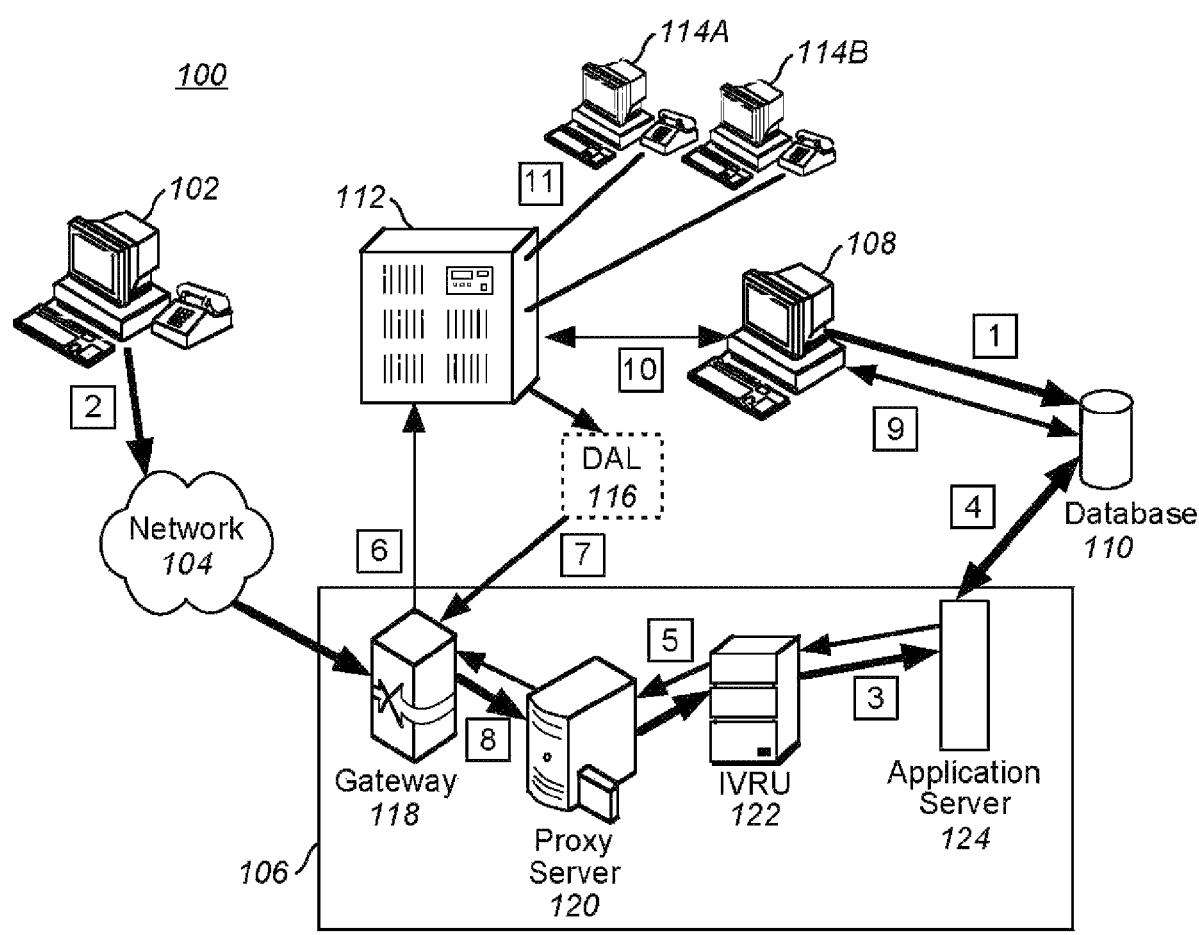
FIG. 1 illustrates an exemplary system for voice monitoring, according to an exemplary embodiment of the present invention.

FIG. 1 illustrates an exemplary system 100 according to an exemplary embodiment of the present invention. FIG. 1 includes blocks 1-11 to illustrate connection establishment and communication between various devices. The system 100 may include a speech voice portal (SVP) 106 for processing a communication request received from a customer communication device 102 over a network 104. The SVP 106 may establish a communication session with the customer communication device 102, may determine whether to set up a monitoring session for monitoring the communication session based on a monitoring request or on a monitoring event, and may establish a monitoring session for conferencing a supervisor workstation 108 into the communication session if certain criteria are met. The monitoring session may permit a supervisor workstation 108 to receive signals, such as voice and/or data, for example, exchanged between the customer communication device 102 and an interactive voice response unit (IVRU) 122 to monitor and/or identify any problems a customer may experience. Additional components, devices, etc., may be implemented in system 100 in accordance with the various exemplary embodiments of the present invention.

Initially, a supervisor at the supervisor workstation 108 may forward a monitoring request to a database 110 (see FIG. 1, block 1). The supervisor workstation 108 may be a computer, a telephone, a videophone, other digital or analog communication devices, and/or combinations thereof For example, the monitoring request may indicate that the supervisor desires to monitor a particular communication session between the customer communication device 102 and the SVP 106 or a communication session from a particular area code. The communication session may be, for example, a telephone call, a video call, a voice over data network call, (e.g., a Voice over IP (VoIP) call), or other communications over a network, for exchanging signals between the customer communication device 102 and the SVP 106.

The monitoring request may include address information to identify a number or an address, or other identifier that may be included in a communication request to establish a communication session with the SVP 106 and/or to identify a number, address or other identifier unique to the customer communication device 102. The address information may be a called telephone number, a data network address (e.g., Internet Protocol (IP) address), an automatic number identification (ANI) number, a Dialed Number Identification Service (DNIS) number, other information useable to identify a destination over a telephony or data network, a calling telephone number, a network source address, other information useable to identify a source over a telephony or data network, and/or combinations thereof The address information included in the monitoring request may identify which communication sessions the supervisor desires to monitor. For example, the address information may be a DNIS number that a customer may dial at a telephone to call the SVP 106. The company may have a technical support number, a sales number, a general number, a toll free number (e.g., an 800 number), etc., a data network address (e.g., IP address), or other number for contacting the company via network 104. In another example, the supervisor may include address information of a phone number for an accounting department in the monitoring request to monitor the calls from the customers calling the accounting department. In a further example, the supervisor may include address information identifying a particular area code to request monitoring of calls from the particular area code. The monitoring request also may indicate that the supervisor desires to monitor the next available communication session, a random communication session, a communication session once in every time period, etc.

The monitoring request also may identify one or more monitoring events. A monitoring event may be a trigger in a communication session for requesting establishment of a monitoring session based on dynamic characteristics occurring in the communication session. For example, the monitoring event may be based on the SVP 106 dynamically detecting: an amplitude of a voice or audible signal (e.g., a user yelling into their telephone); offensive language; a circular sequence of questions (e.g., a user is asked a first question, then one or more other questions, and then the user is asked the first question again); that a user has been asked more than a certain number of questions without a resolution (e.g., asking a user ten different questions); that the user has been asked to repeat a response more than a specified number of times; that a user has not been recognized as a known customer (e.g., user recognition issues); voice user interface optimization; a speed of the system (e.g., slow response, etc.); and/or combinations thereof Detecting one or more of the monitoring events may trigger a request for establishing a monitoring session and/or may trigger a request for forwarding of the communication session to a customer service agent 114A-B, as will be described in further detail below.

The database 110 may store a table based on information received in the monitoring request. FIG. 2 illustrates an exemplary table 200. The table 200 may include a monitoring request number column 202, an address information column 204, and a monitoring event column 206. For monitoring request number 1, the address information column 204 specifies monitoring calls to a particular called telephone number, and the monitoring event column 206 includes monitoring events to request establishing a monitoring session when the SVP 106 detects a voice amplitude of the customer's speech being above a certain level in a communication session. For monitoring request number 2, the address information column 204 specifies monitoring calls to a particular network address, and the monitoring event column 206 includes a monitoring event for generating a request for establishing a monitoring session based on identifying a circular sequence of questions in a communication session. For monitoring request number 3, the address information column 204 specifies monitoring calls to a particular calling telephone number, and the monitoring event column 206 includes a monitoring event for generating a request for establishing a monitoring session based on a customer being asked a predetermined number of questions in a communication session. Identifying a monitoring event also may automatically request that the SVP 106 route the communication session to the agent workstation 114A or 114B.

The SVP 106 may receive signals from the customer communication device 102 via the network 104. Signals may include digital data (e.g., IP packets, ATM cells, etc.), voice signals (e.g., voice signals, telephony signals), request signals (e.g., SS7, telephony connection requests), etc. The customer communication device 102 may be a telephone, a Session Initiation Protocol (SIP) client, a Voice over Data (VoD) network device (e.g., VoIP device), other devices for capturing and communicating audio and/or video with a network, and/or combinations thereof In an exemplary embodiment, the network 104 may be a telephony network and may support conventional telephony calls, or may be a data network and support Voice over Data Network calls. For example, telephony networks may include a plain old telephone service (POTS) network, a public switched telephone network (PSTN), other conventional voice or telephony networks, as are well known, and/or combinations thereof The telephony network 104 may use connection establishment and termination requests, such as Signaling System 7 (SS7). Data networks, for example, may include packet-switched networks, such as IP networks, circuit-switched networks, such as Asynchronous Transfer Mode (ATM) Networks, other conventional data networks for transporting digital data, as are well known, and/or combinations thereof Additionally, the network 104 may include various combinations of telephony networks and/or data networks with devices therebetween for converting between telephony signals and digital data, as are well known.

The SVP 106 may include a gateway 118, a proxy server 120, an interactive voice response unit (IVRU) 122, and an application server 124. The gateway 118 may receive an incoming communication request via the network 104 based on signals generated by the customer communication device 102 (see FIG. 1, block 2). The communication request may request establishment of a communication session between the customer communication device 102 and the SVP 106. The communication session may permit exchange of digital data (e.g., packets, frames, cells, etc.) or telephony signals between the customer communication device 102 and the SVP 106.

For example, based on dialed digits received from the customer communication device 102, a switch of the network 104 may generate a SS7 initial address message (IAM) as the communication request. In another example, the customer communication device 102 may generate a SIP Invite message as the communication request to establish a SIP dialog with the SVP 106. The communication request may include address information, such as, but not limited to, a destination address of the gateway 118, a called party number, a calling party number, a source address, Automatic Number Identification (ANI) number (e.g., caller ID number), telephone number customer is calling from, destination number of the switch where the call will be routed for monitoring, etc., and/or combinations thereof.

If the communication request is received via a telephony network, the gateway 118 may packetize the communication request into a series of one or more packets (e.g., IP packets), and also may convert voice signals into packets once a communication session is established between the customer communication device 102 and the IVRU 122. Also, the gateway 118 may convert the incoming communication request and voice signals into other data types, such as frames, ATM cells, etc, as are well known. If the communication request is received via a data network, the communication request and voice signals may already be conveyed via packets and the gateway 118 may skip packetizing the incoming communication request and the voice signals. Also, the gateway 118 may repacketize the incoming packets, or may convert the incoming packets to a different data type. For example, the gateway 118 may convert a series of IP packets into ATM cells. The gateway 118 may forward the series of one or more packets to the proxy server 120.

The proxy server 120 may forward the request to one of the IVRUs 122 based on a load balancing algorithm (e.g., round robin). It is noted that FIG. 1 depicts a single IVRU 122. However, the depicted IVRU 122 also may represent a plurality of IVRUs. The proxy server 120 also may act as a failover server between the gateway 118 and the telephony network should the gateway 118 fail, be temporarily shut down for servicing, be otherwise unavailable, etc. In an exemplary embodiment, the proxy server 120 may be a SIP proxy server.

The IVRU 122 may be a server or other computing device that interacts with a user of the customer communication device 102. The IVRU 122 may be a voice extensible markup language (VXML) server, a call control extensible markup language (CCXML) server, or other devices useable to interact with voice and/or data produced by the customer communication device 102. The IVRU 122 may generate packets for producing audible voice prompts to cue the customer to input various types of information. For example, the IVRU 122 may generate voice prompt packets that are converted to signals for producing an audible message at the customer communication device 102. The audible message may ask the customer to input and/or speak an account number, select from one or more options. For example, the voice prompt packets may be converted to audible signals at the gateway 118, or may be transported via the network 104 and converted to audible signals the customer communication device 102 or at other locations coupled to the network 104. Additionally, the voice prompt packets may include text or video displayable at the customer communication device 102.

The IVRU 122 may respond to questions asked by the customer, and, if unable to answer the customer's question, may route the communication session to an appropriate destination, such as a customer service agent at an agent workstation 114A or 114B. The agent workstations 114A-B may include a telephone, a computer, other analog or digital communication devices, and/or combinations thereof for audio, text, video, etc., communication with the customer at the customer communication device 102.

When the incoming communication request is received, the IVRU 122 may generate a request query including the address information from the communication request and may forward the request query to the application server 124 (see FIG. 1, block 3). For example, the IVRU 122 may establish a SIP subdialog call to the application server 124 and may forward a DNIS number dialed by the customer as an input parameter. A servlet, and/or or other computer program and/or hardware, operating on the application server 124 may process the request query to determine whether any supervisor workstation has requested to conference into a communication session between the customer communication device 102 and the IVRU 122. For example, a supervisor at the supervisor workstation 108 may forward a monitoring request indicating a desire to monitor any customer interaction with the IVRU 122 for customers who have called a technical support number or who have called from a particular area code.

The servlet running on the application server 124 may generate an address information query for the database 110 including the address information from the request query. The database 110 may return an address information query response identifying whether a monitoring request has been received that is associated with the address information included in the address information query. For example, the database 110 may receive a monitoring request identifying a particular DNIS. Once the address information query is received, the database 110 may determine whether a DNIS in the address information query matches the particular DNIS from the monitoring request.

The database 110 may return an address information query response identifying whether the address information of the communication request is the same as any address information stored in the database 110. If the address information of the communication request is not the same as any address information stored in the database 110, then the address information query response may indicate that the address information does not correspond to any monitoring requests stored in the database 110, and hence not to monitor a communication session established based on the communication request. In such a scenario, the IVRU 122 may interact with the user of the customer communication device 102 via the communication session and/or may route the communication session to an agent at the agent workstation 114A or 114B, if necessary.

If the address information of the communication request matches an address information stored in the database 11 0, then the address information query response may indicate to monitor a communication session established based on the communication request. The address information query response also may include a switch address of switch 112 identifying a network address of the switch 112. For example, the switch address may be a DNIS of the switch 112. The SVP 106 may route the communication session through the switch 112 to permit establishment of a monitoring session to conference the supervisor workstation 108 into the communication session.

The IVRU 122 may generate a switch communication request including the switch address (see FIG. 1, block 5). For example, the IVRU 122 may out dial a call to the switch 112 based on a specific DNIS. The switch communication request may be routed through the proxy server 120 and the gateway 118 to the switch 112 to establish a connection between the gateway 118 and the switch 112, which may route the switch communication request to a dynamic agent locator (DAL) 116 (See FIG. 1, block 6). The DAL 116 may interact with the switch 112 and may generate a gateway communication request to establish a return connection with the gateway 118 (See FIG. 1, block 7). For example, the DAL 116 may automatically dial a call to the gateway 118 upon receipt of the switch communication request. Once the connection is established with the gateway 118, the SVP 106 may have established a connection loop from the gateway 118 to the switch 112 and back to the gateway 118. The process of creating a connection loop between the gateway 118 and the switch 112 also may be referred to as bouncing a call off of the switch 112. For example, the gateway 118 may be connected to the switch 112 by T1 lines. Also, the switch 112 may include built-in service observe features for monitoring the communication session.

After the connection loop is established, the gateway 118 may route all of the signals exchanged via the communication session between the customer communication device 102 and the IVRU 122 through the switch 112. The gateway 118 may convert the signals received from the customer communication device 102 to digital data (e.g., packets) before forwarding to the switch 112, and may convert the signals received from the IVRU 122 to telephony signals before forwarding to the switch 112. Also, the gateway 118 may forward the signals received from the customer communication device 102 to the switch 112, and may convert the signals received from the switch 112 to digital data (e.g., packets) before forwarding to the IVRU 122. Additionally, the gateway 118 may forward the packets received from the IVRU 122 to the switch 112 and may convert the packets received from the switch to telephony signals before forwarding to the network 104 if the network 104 is a telephony network. Other permutations of when conversion between digital and analog signals occurs at the gateway 118 also may be performed. The process of converting between packets and telephony signals may be skipped if the network 104 is a digital data network (e.g., IP network). After the connection loop is established, the gateway 118 may instruct the application server 124 to update the database 110 with the switch address of the switch 112 (see FIG. 1, block 8).

Upon sending the monitoring request to the database 110, a computer program and/or hardware of the supervisor workstation 108 may query and monitor the database 110 to determine if the application server 124 has updated the database 110 with the switch address. Once updated, the supervisor workstation 108 may obtain the switch address from the database 110 (see FIG. 1, block 9). The supervisor workstation 108 may generate a monitoring session request including the switch address to establish a monitoring session with the switch 112 (see FIG. 1, block 10). The monitoring session may permit exchange of signals, such as digital data (e.g., IP packets, packets, frames, cells, etc.) or telephony signals, for example, between the supervisor workstation 108 and the switch 112. In an exemplary embodiment, the supervisor workstation 108 may dial a switch DNIS number identified as the switch address to establish a monitoring session for monitoring an incoming call to a particular DNIS number. The switch 112 may receive the monitoring session request and may establish a monitoring session between the supervisor workstation 108 and the switch 112 conferencing the supervisor workstation 108 into the communication session between the customer communication device 102 and the IVRU 122. The monitoring session may permit the supervisor workstation 108 to receive all digital data and/or telephony signals exchanged between the customer communication device 102 and the IVRU 122. For example, the switch 112 may broadcast the signals, such as voice and/or data signals, for example, exchanged between the customer communication device 102 and the IVRU 122 to the supervisor workstation 108.

Once the monitoring session is established, the supervisor workstation 108 may or may not be permitted to input voice signals and/or voice packets into the communication session through the monitoring session for communicating with the customer communication device 102 and/or the IVRU 122. For example, the supervisor may be permitted to speak into the supervisor workstation 108, which may forward voice or video data, voice or video signals, and/or text data through the monitoring session for placement into the communication session for communicating with the customer and/or the IVRU 122. Otherwise, the supervisor workstation 108 may silently conference the supervisor into the communication session to permit the supervisor to listen to and/or view the customer interaction with the IVRU 122, but not to speak or otherwise interact with the customer and/or the IVRU 122.

If the IVRU 122 determines to transfer the communication session to the agent workstation 114, the gateway 118 may terminate the connection with the IVRU 122 and may route the communication session to the agent workstation 114 through the switch 112 (see FIG. 1, block 11). The gateway 118 may instruct the switch 112 to retain the monitoring session and may instruct the switch 112 to terminate the return connection to the gateway 118 through DAL 116. If the supervisor workstation 108 terminates the monitoring session, the switch 112 may terminate the connection to the supervisor workstation 108 and may retain the connection to the agent workstation 114 until either the customer or the agent terminates the communication session.

During or after establishment of the monitoring session, the supervisor workstation 108 may obtain a user profile from the database 110 associated with the customer based on the address information included in the communication request. For example, the address information may include a calling party number or other information that may identify a user profile including a name of the user, an account number, account history, address, other information about the user, etc., and/or combinations thereof The supervisor workstation 108 may populate a user interface based on the received user profile to allow a supervisor to take notes as the customer interacts with the IVRU 122. For example, the supervisor may indicate what the customer said in response to a particular prompt by the IVRU 122, the number of repeats requested from the customer by the IVRU 122, the quality of the voice prompts, response time of the IVRU 122 after a prompt, routing issues (e.g., indicating if the IVRU 122 properly routes the call based on the user's response if the prompt is used for routing the call), validation of a customer account data which is retrieved as a response to a voice prompt, etc., and/or combinations thereof Additionally, once the call is forwarded to the customer service agent at the agent workstation 114, the supervisor also may takes notes on the agent's interaction with the customer.

Thus, the SVP 106 may establish a connection through the switch 112 that may be used to establish a monitoring session for conferencing a supervisor workstation 108 into a communication session to permit monitoring of the interaction between the customer communication device 102 and the IVRU 122.

Figure 3:
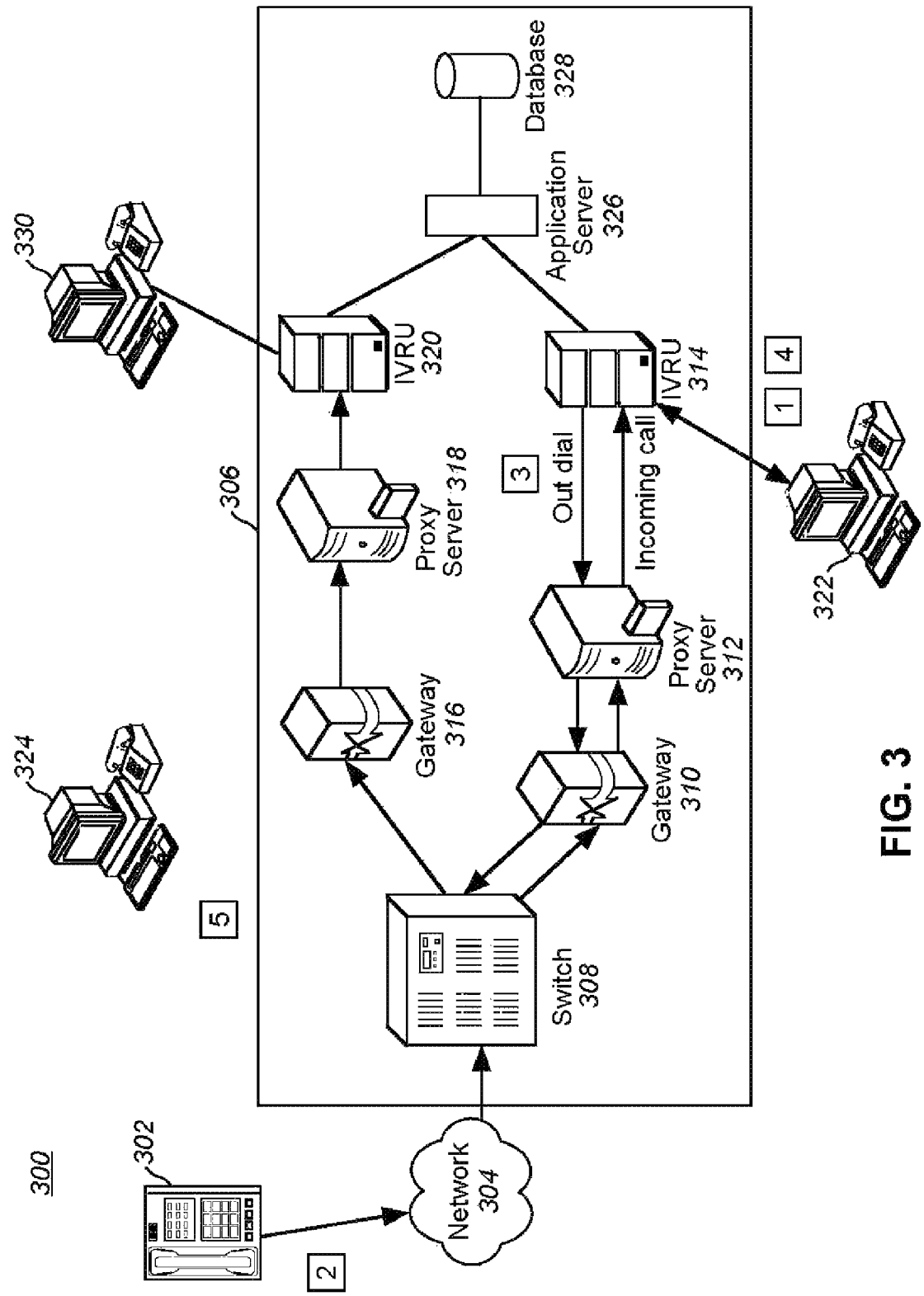
FIG. 3 illustrates an exemplary system for voice monitoring, according to an exemplary embodiment of the present invention.
Figure 5:
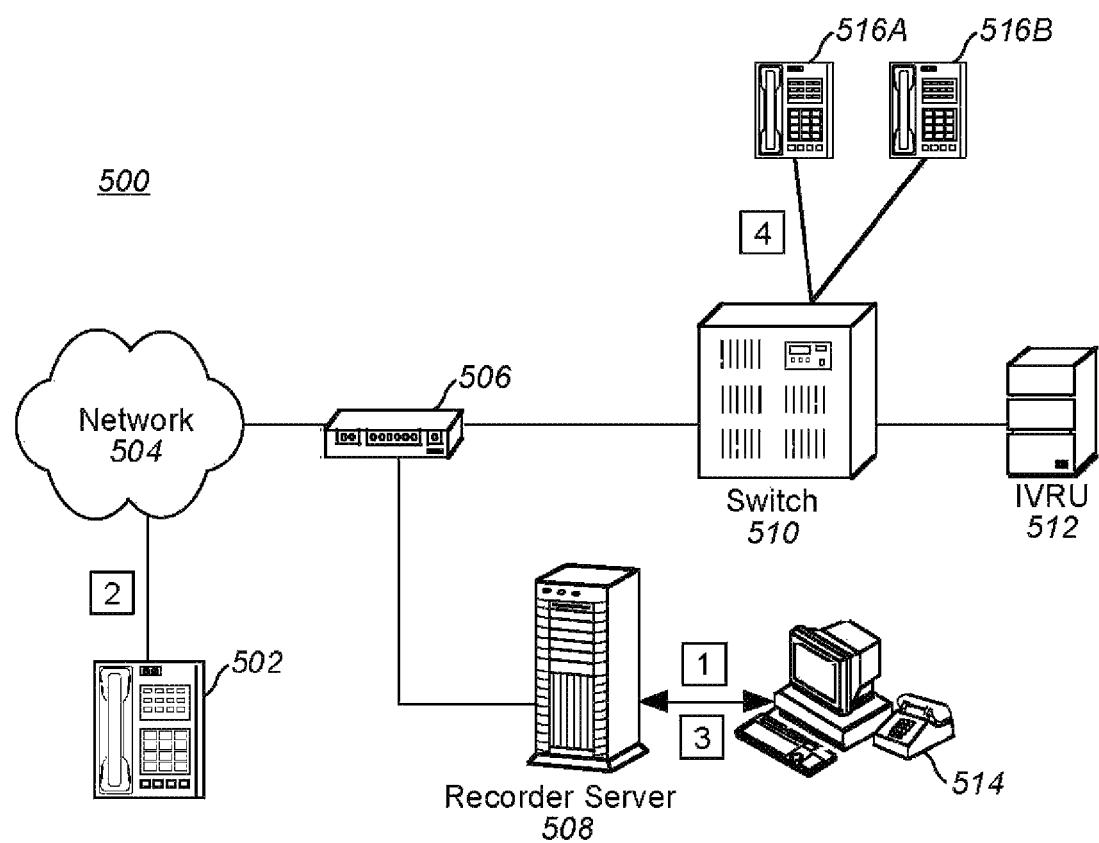
FIG. 5 illustrates an exemplary system for voice monitoring, according to an exemplary embodiment of the present invention.

FIG. 3 illustrates an exemplary embodiment of a system 300 for voice monitoring, according to an exemplary embodiment of the present invention. Blocks 1-5 in FIG. 5 are included to further illustrate connection establishment and communication between various devices. The system 300 may include a customer communication device 302 for communicating with a speech voice portal (SVP) 306 via network 304. Additional components, devices, etc., may be implemented in system 300 in accordance with the various exemplary embodiments of the present invention.

The SVP 306 may receive a communication request from the customer communication device 302 and may establish a communication session between the customer communication device 302 and the SVP 306. The SVP 306 may interact with the customer, may route the communication session to an agent workstation 324, may permit a supervisor workstation 322 to monitor the communication session, and/or combinations thereof The supervisor workstation 322 may generate a monitoring request useable to request establishment of a monitor communication session when a communication request includes certain address information and/or to set up monitoring events for triggering establishment of a monitoring session (see FIG. 3, block 1), as discussed above.

The SVP 306 may include a switch 308, a gateway 310, a proxy server 312, an interactive voice response unit (IVRU) 314, a gateway 316, a proxy server 318, an IVRU 320, an application server 326, and a database 328. The switch 308 may receive a communication request via the network 304 based on signals communicated by the customer communication device 302 (See FIG. 3, block 2). The switch 308 may forward the communication request to the IVRU 314 through the gateway 310, which may convert the communication request into one or more packets if the network 304 is a telephony network, and through the proxy server 312. The conversion may be skipped if the data network 304 is a digital data network. The proxy server 312 may provide call load balancing for the IP telephony network based on a load balancing algorithm.

The IVRU 314 and the IVRU 320 may be servers for responding to a voice and/or data received from the customer communication device 302 via the network 304. The IVRU 314 may generate a query based on address information included in the communication request and may forward the query to the application server 326 to determine whether to monitor a communication session established based on the communication request, as discussed above. If the application server 326 determines that the communication session is not to be monitored, the application server 326 may forward a query response to the IVRU 314 indicating that the communication session is not to be monitored. The IVRU 314 may respond to the communication session and/or may instruct the switch 308 to forward the communication session to the agent workstation 324 (see FIG. 3, block 5).

If the application server 326 determines that a communication session based on the communication request is to be monitored, the application server 326 may instruct the IVRU 314 to route the communication session to the IVRU 320. The IVRU 314 may generate and may forward a voice response request to the IVRU 320 through the switch 308. For example, the IVRU 314 may dial out to establish a connection with IVRU 320. Also, the IVRU 314 may generate and forward a voice response request to the IVRU 320 through the switch 308 upon identifying a monitoring event, as described above. The voice response request may request the IVRU 320 generate the voice prompt packets for interacting with the customer. The communication session may be routed through the IVRU 314, which may not generate any voice prompt packets.

Once the voice response request is received, the IVRU 320 may transmit a success response to the IVRU 314 indicating successful receipt and establishment of the connection. The IVRU 314 may route packets of the communication session received from the customer communication device 302 to the IVRU 320 via the switch 308, and may route packets of the communication session received from the IVRU 320 through the switch 308 to the customer communication device 302 via the network 304.

After receiving the success message, the IVRU 314 may forward a monitoring session request to the supervisor workstation 322 to establish a monitoring session for conferencing the supervisor workstation 322 into the communication session. The supervisor workstation may be a telephone, a SIP client, or other device for receiving and transmitting digital data and/or analog signals. The monitoring session request may be a SS7 communication request for ringing a telephone or may be a data request for establishing a voice over data call (e.g., VoIP call), for example. Once the monitoring session is established, the IVRU 314 may broadcast signals and/or packets exchanged in the communication session between the customer communication device 302 and the IVRU 320 over the monitoring session for conferencing the supervisor workstation 322 into the communication session. For example, the supervisor workstation 322 may sniff a port (e.g. SIP Port 5060) on the IVRU 314 to gather real time protocol (RTP) packets on a specific DNIS as the customer interacts with voice prompts from the IVRU 320. The supervisor workstation 322 may have a user interface populated with information based on address information included in the communication request for taking notes on the communication session, as discussed above.

If the IVRU 320 transfers the communication session to the agent workstation 324, the switch 308 may terminate the connection with the IVRU 320 and may reroute the communication session to the agent workstation 324. The switch 308 may continue to route the communication session through the IVRU 314, thus retaining the monitoring session. If the supervisor workstation 322 terminates the monitoring session, the switch 308 may terminate the connection to the IVRU 314 and may route the communication session directly to the agent workstation 324.

It is noted that various modifications may be made to the system 300. For example, the SVP 306 may not include the gateway 316, the proxy server 318, and the IVRU 320. In this example, the IVRU 314 may both generate voice prompt packets for interacting with the customer communication device 302 and may establish a monitoring session conferencing the supervisor workstation 322 into the communication session. In another exemplary modification when both the IVRU 314 and the IVRU 320 are included, the IVRU 314 may generate the voice prompt packets for interacting with a user of the customer communication device 302 and the IVRU 320 may establish a monitoring session with a supervisor workstation 322. Also, the system 300 may include supervisor workstation 330 that may establish a monitoring session with either the IVRU 320 or IVRU 314. Other modifications to system 300 also may be made.

Figure 4:
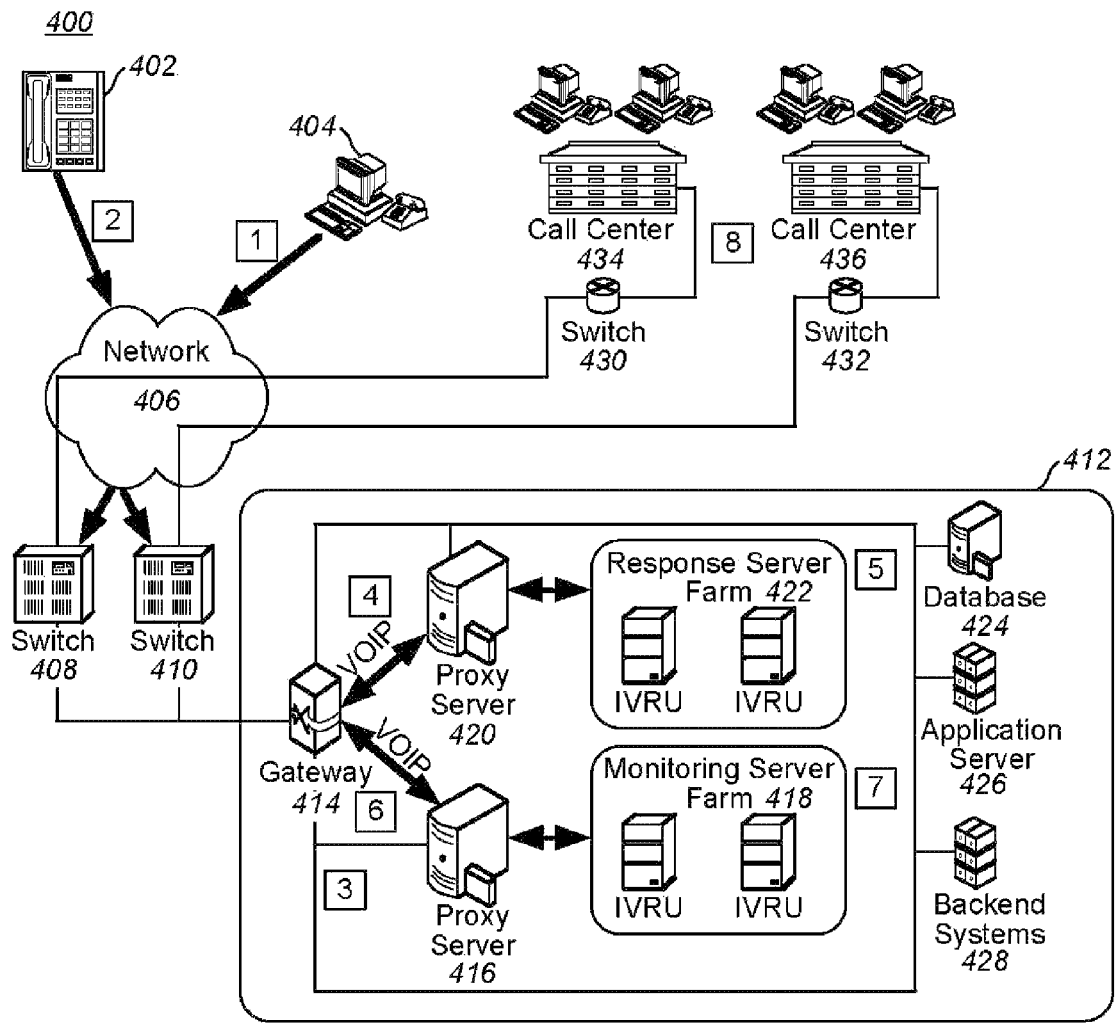
FIG. 4 illustrates an exemplary system for voice monitoring, according to an exemplary embodiment of the present invention.

FIG. 4 illustrates an exemplary embodiment of a system 400 for voice monitoring, according to an exemplary embodiment of the present invention. The system may permit a supervisor at a supervisor workstation 404 to call a speech voice portal (SVP) 412 via a network 406 to establish a monitoring session for remotely monitoring interaction between a user of the customer communication device 402 and an interactive voice response unit (IVRU) over the network 406. Blocks 1-8 are included in FIG. 4 to further illustrate connection establishment and communication between various devices. Additional components, devices, etc., may be implemented in system 400 in accordance with the various embodiments of the present invention.

The supervisor workstation 404 may generate a monitoring request (e.g., dial a 800 number) to request establishment of a monitoring session with the SVP 412 for monitoring a communication session between a customer communication device 402 and the SVP 412. The network 406 may route the monitoring request to the SVP 412, where a gateway 414 may route the monitoring request to backend systems 428 that may prompt the supervisor to input identification information for authentication (See FIG. 1, block 3). For example, the input information may be a name and a password code. Other types of identification information uniquely identifying the supervisor also may be used.

The SVP 412 also may authenticate multiple supervisors and may create a monitoring bridge for establishing multiple communication sessions for conferencing multiple supervisor workstations into a communication session. The monitoring bridge may be set up by initiating a call to the gateway 414. Additionally, the supervisor may instruct recording of calls for later access through an operations (OPS) portal. For example, the OPS portal may be an administration and reporting website that may be used to show the number of calls monitored versus the total number of calls over a time period (e.g., daily, weekly, monthly, yearly, etc.). The OPS portal also may allow a user to change dynamic configuration for the type of calls to be monitored. For example, the OPS portal may randomly select calls for monitoring. Call monitoring reports may be generated and plugged into the OPS portal.

Once the supervisor is authenticated, the backend systems 428 may process the monitoring request with address information of an address for monitoring. For example, the address information may be a spoken or dialed DNIS number. The backend systems 428 may forward the address information to database 424 for storage. The backend systems 428 may place the monitoring session in a waiting state until a communication request originates containing the entered address information and a communication session is established. Also, the SVP 412 may immediately conference the supervisor workstation 404 if the communication session has already been established.

The SVP 412 may receive a communication request based on signals generated by the customer communication device 402 requesting establishment of a communication session. For example, the user may dial an 800 number to call technical support. The communication request may be routed over network 406 to switch 408 or 410. The network 406 may be a Transfer Number Table (TNT) platform, for example. Switches 408 and 410 may be a Rockwell switches. Switch 408 or 410 may route the communication request to the SVP 412.

A gateway 414 of the SVP 412 may receive the communication request and may convert the communication request into packets, such as VoIP packets, if the network 406 is a telephony network. The gateway 414 may skip the conversion into packets if the communication request already is in packet form. The gateway 414 may forward the packetized communication request to application server 426. The application server 426 may generate a query based on the address information in the communication request and may forward the query to the database 424 to determine whether to monitor the communication session associated with the communication request. The application server 426 may return a query response to the gateway 414 indicating whether the communication session is to be monitored.

The gateway 414 may then route the communication session to the proxy server 420 if the connection is not to be monitored (see FIG. 4, block 4), or may route the communication session to the proxy server 416 if the connection is to be monitored (see FIG. 4, block 6). Proxy servers 416 and 420 may be SIP proxy servers and may exchange VoIP packets with the gateway 414, for example. The proxy server 420 may load balance the packets associated with the communication session with packets from other communication sessions to efficiently distribute communication sessions to the servers within the response server farm 422 (see FIG. 4, block 5). The response server farm 422 may include one or more voice extensible markup language (VXML) servers to interact with spoken voice for assisting customers. If unable to service the customer within the SVP 412, the VXML server may transfer the communication session to an agent in a call center 434 or 436 and may instruct the gateway 414 to disconnect the SVP 412 from the communication session.

The proxy server 416 may load balance and forward all communication sessions selected for monitoring to a monitoring server farm 418 (see FIG. 4, block 7). The monitoring server farm 418 may include one or more Interactive Voice Response Units (IRVUs) for establishing a communication session with the customer communication device 402 for speech processing.

Once the communication session is established, the IVRU with which the communication is established may communicate with the gateway 414 and the backend systems 428. The backend system 428 may end the waiting state of the monitoring session and conference the supervisor workstation 404 into the communication session between the customer communication device 402 and the IVRU of the monitoring server farm 418. For example, the IRVUs of the monitoring server farm 418 may include call control extensible markup language (CCXML) server capabilities for conferencing the customer call with the supervisor in a monitoring session while interacting with the customer. The supervisor workstation 404 may have a user interface populated with information based on address information included in the communication request for taking notes on the communication session, as discussed above.

In the event the IRVU of the monitoring server farm 418 transfers the communication session to an agent at call center 434 or at call center 436, the communication session may remain routed through the SVP 412 to permit conferencing via the monitoring session. In such a scenario, the communication session may remain routed through the gateway 414, which may then route the communication session to a switch 430 or 432 associated with the call center 434 or 436. If the supervisor terminates the monitoring session, the gateway 414 may generate various requests for routing the communication session through the network 406 to the switch 430 or 432.

FIG. 5 illustrates an exemplary system 500 for voice monitoring, according to an exemplary embodiment of the present invention. Blocks 1-4 are included to further illustrate the connection establishment and communication between the various devices. Additional components, devices, etc., may be implemented in system 500 in accordance with the various embodiments of the present invention.

A user of customer communication device 502 may establish a communication session with the IVRU 512 through network 502, service unit 506, and switch 510. A service unit 506 may receive digital data frames from the customer communication device 502 via network 504. The digital data frames may include the communication request, packets, voice signal, etc. The service unit 506 may include a channel service unit (CSU) that may receive the digital data frames via a T1/E1 line coupled to the network 504. Digital data types other than frames also may be used. The service unit 506 may translate the digital data frames into an IEEE 802.3 connection, for example. If the T1/E1 line is used for voice communications, the service unit 506 may include a channel service unit/data service unit (CSU/DSU) to translate the digital frames into signals that may be interpreted by a phone switch. The network 504 may include multiple CSU/DSUs communicating with one another.

A recorder server 508 may monitor the digital frames destined for a switch 510 at the service unit 506. The recorder server 508 may start and stop recordings of the digital frames based on events (e.g., on-hook/off-hook) received from the network 504. The recorder server 508 may monitor and record some fraction (e.g., between zero to one hundred percent, inclusive) of the digital data frames received at the service unit 506. The amount of traffic recorded may be specified by a user of a supervisor workstation 514, e.g., the user may use the supervisor workstation 514 to establish a monitoring session with the recorder server 508 to receive the digital data frames recorded at the recorder server 508.

The supervisor workstation 514 may specify address information in a monitoring request. The recorder server 508 may receive the monitoring request and may monitor the digital data frames received at the service unit 506 for the specified address information (see FIG. 5, block 1). The recorder server 508 also may perform similar functions to the application server and database, as described above. The service unit 506 may receive a communication request including address information from the network 504 based on signals generated by the customer communication device 502 (see FIG. 5, block 2). For example, the communication request may be SS7 signaling or may be a SIP Invite message. If the recorder server 508 identifies address information in the digital frames monitored at the service unit 506 corresponding to the address information of the monitoring request, then the recorder server 508 may forward a monitoring session communication request to the supervisor workstation 514 to establish a monitoring session conferencing the supervisor workstation 514 into the communication session between the customer communication device 502 and the IVRU 512 (see FIG. 5, block 3). The supervisor workstation 514 may have a user interface populated with information based on address information included in the communication request for taking notes on the communication session, as discussed above. Once the monitoring session is established, the supervisor workstation 514 may receive all signals (e.g., voice signals, voice prompt packets, packets, etc.) communicated between the customer communication device 502 and the IVRU 512.

If the IVRU 512 is unable to assist the customer, then the IVRU 512 may instruct the switch 510 to route the communication session to an agent workstation 516A or 516B to speak with an available customer service agent. In this scenario, the recorder server 508 may continue conferencing the supervisor workstation 514 into the communication between the customer communication device 502 and the agent workstation 516. If the supervisor workstation 514 terminates the monitoring session, then the recorder server 508 may terminate recording the communication session between the customer communication device 502 and the IVRU 512 and/or the agent workstation 516.

Figure 6:
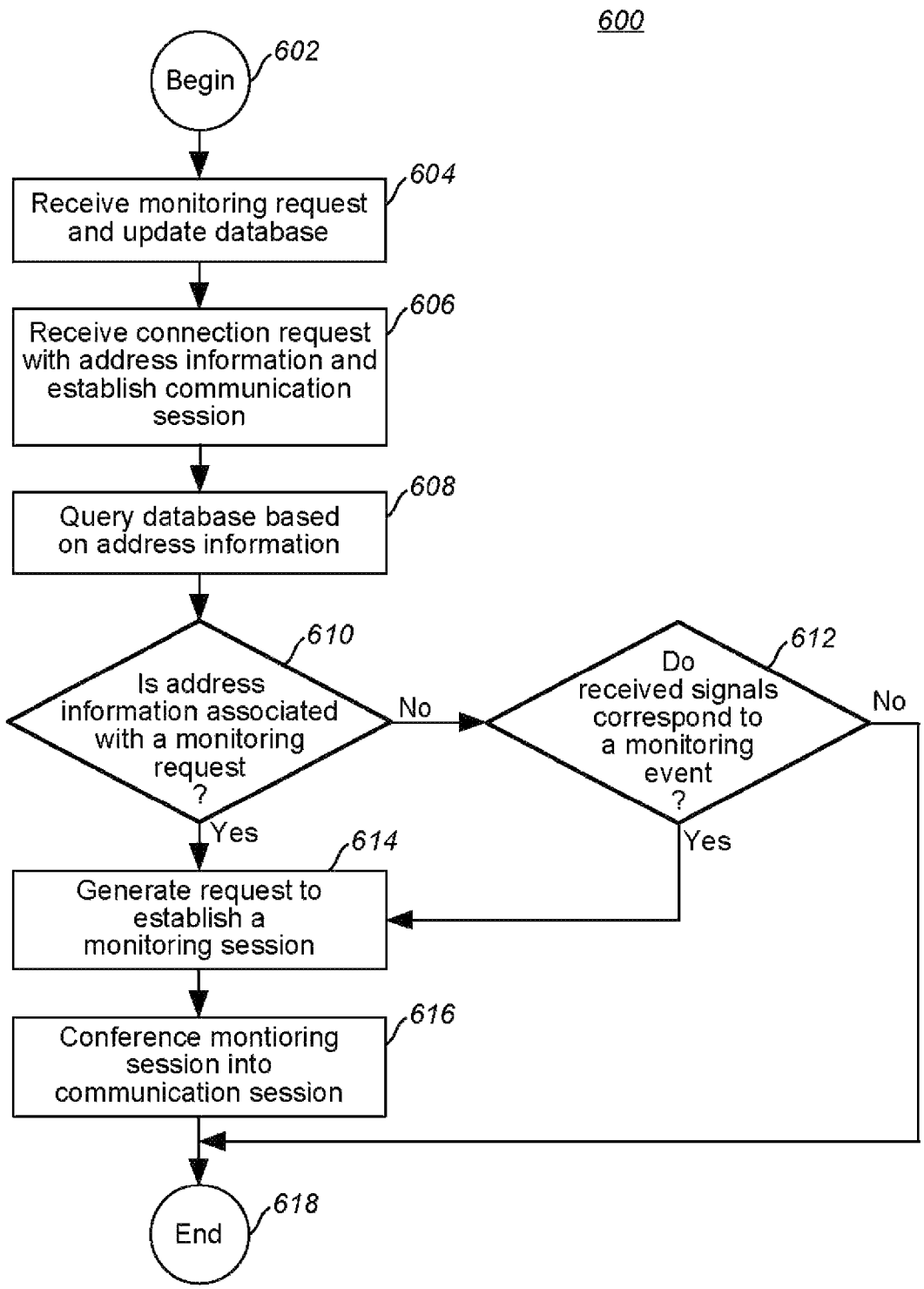
FIG. 6 illustrates an exemplary flow diagram for determining whether to establish a monitoring session, according to an exemplary embodiment of the present invention.

FIG. 6 illustrates an exemplary flow diagram for determining whether to establish a monitoring session, according to an exemplary embodiment of the present invention. The flow diagram 600 may begin at 602 and may continue to 604.

In 604, the database 110 may receive a monitoring request including address information from the supervisor workstation 108.

In 606, the SVP 106 may receive a communication request at the gateway 118 via the network 104 based on signals generated by the customer communication device 102. For example, the communication request may comprise a Signaling System 7 (SS7) initial address message (IAM), which may include the called number. The communication request also may be a SIP Invite message. The gateway 118 may use the communication request to establish a communication session between the customer communication device 102 and the IVRU 122.

In 608, the IVRU 122 may receive the communication request from the gateway 118, may generate a query including the address information, and may forward the query to the application server 124. The application server 124 may query the database 110 to determine whether the address information in the query matches any address information stored in the database 110.

In 610, if an address information in the database 110 matches the address information from the query, the flow diagram 600 may continue to 614. If the address information from the query does not correspond to any address information stored in the database 110, or if the database 110 does not contain any address information, the flow diagram 600 may continue to 612.

In 612, the IVRU 122 may dynamically monitor the signals communicated in the communication session between the customer communication device 102 and the IVRU 122 based on one or more monitoring events indicated in the monitoring request. If the signals in the communication session do not correspond to one or more monitoring events, the flow diagram 600 may continue to 618 and end. If the signals in the communication session correspond to a monitoring event, the flow diagram 600 may continue to 614.

In 614, the application server 124 may forward a query response to the IVRU 122 indicating that the communication session based on the communication request is to be monitored, and the IVRU 122 may generate and forward a request to the gateway 118. The gateway 118 may forward the request to the switch 112 to establish a connection between the gateway 118 and the switch 112. The DAL 116 may process the request and may redial the gateway 118 to establish a connection with the gateway 118 and to inform the gateway 118 that a connection loop through the switch 112 has been established. The gateway 118 may forward all signals received from the network 104 and from the IVRU 122 through the switch 112, which returns the signals to the gateway 118 via the connection loop. After the connection loop has been established, the gateway 118 may generate and forward a success message to the application server 124, which updates the database 110 with a switch address of the switch 112. The supervisor workstation 108 may monitor and obtain the switch address from the database 110 and may forward a monitoring session request to the switch 112 including the switch address.

In 616, the switch 112 may establish a monitoring session conferencing the supervisor workstation 108 into the communication session by broadcasting all signals received from the customer communication device 102 and from the IVRU 122 in the communication session to the supervisor workstation 108 via the monitoring session. The flow diagram 600 may continue to terminal state 618.

The description above provides a discussion of computing devices, such as servers, computers, workstations, gateways, IVRUs, databases, etc. These computing devices may include software, firmware, hardware, and/or various combinations thereof It is noted that the various types of computing devices are exemplary. The computing devices may be combined, integrated, separated, and/or duplicated to support various applications. Also, a function described herein as being performed at a particular computing device may be performed by one or more other computing devices instead of or in addition to the function performed at the particular computing device as described. Further, the functions of each computing device may be implemented across multiple computing devices local or remote to one another.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:
1. A method comprising:
processing a communication request for establishing a communication session to communicate signals between an interactive voice response device and a first communication device over a network;

identifying a monitoring request comprising address information associated with the communication request for requesting monitoring of the communication session; and instructing establishment of a monitoring session for conferencing a second communication device into the communication session to receive the signals communicated between the interactive voice response device and the first communication device at the second communication device, wherein if the monitoring request comprising address information is not identified, further comprising:

communicating signals between the first communication device and the interactive voice response unit using the communication session;

identifying a monitoring event based on the signals communicated in the communication session; and requesting establishment of the monitoring session to conference the second communication device into the communication session based on the monitoring event.

2. The method of claim 1, further comprising routing the communication session from the interactive voice response device to an agent communication device.

3. The method of claim 1, further comprising routing the communication session through a switch.

4. The method of claim 3, further comprising establishing the monitoring session between the switch and the second communication device.

5. The method of claim 1, further comprising routing the communication session to a second interactive voice response device.

6. The method of claim 5, wherein the second interactive voice response device generates voice prompt packets for generating a textual, audible, or visual message.

7. The method of claim 5, further comprising establishing the monitoring session between the second interactive voice response device and the second communication device.

8. A non-transitory computer readable media comprising code to perform the acts of the method of claim 1.

9. A method comprising:

processing a communication request to establish a communication session between an interactive voice response unit and a first communication device via a network;

identifying a monitoring request comprising address information associated with the communication request for requesting monitoring of the communication session, wherein if the monitoring request comprising address information is not identified, further comprising:

communicating signals between the first communication device and the interactive voice response unit using the communication session;

identifying a monitoring event based on the signals communicated in the communication session; and establishing a monitoring session for conferencing a second communication device into the communication session to receive the signals communicated between the first communication device and the interactive voice response unit using the communication session.

10. The method of claim 9, further comprising monitoring dynamic characteristics of the signals, wherein the monitoring event is identified based on monitoring the dynamic characteristics.

11. The method of claim 10, wherein monitoring dynamic characteristics of the signals measures an amplitude of the signals.

12. The method of claim 9, wherein the monitoring event corresponds to a circular sequence of questions.

13. The method of claim 9, wherein the monitoring event corresponds to a predefined number of questions.

14. The method of claim 9, wherein the monitoring event corresponds to prompting a user to repeat an answer to a question a predefined number of times.

15. A non-transitory computer readable media comprising code to perform the acts of the method of claim 9.

16. A method comprising:

processing a communication request including address information to establish a communication session between an interactive voice response unit and a first communication device over a network;

determining whether the address information is associated with a monitoring request; and requesting establishment of a monitoring session to conference a second communication device into the communication session if the address information is associated with the monitoring request, wherein if the address information is not associated with the monitoring request, further comprising:

communicating signals between the first communication device and the interactive voice response unit using the communication session;

identifying a monitoring event based on the signals communicated in the communication session; and requesting establishment of the monitoring session to conference the second communication device into the communication session based on the monitoring event.

17. The method of claim 16, wherein the monitoring request includes second address information, and wherein the monitoring session is established if the address information matches the second address information.

18. A non-transitory computer readable media comprising code to perform the acts of the method of claim 16.

19. A system comprising:

a gateway device to receive a communication request over a network, the communication request including address information;

an interactive voice response unit communicatively coupled to the gateway device and being configured to establish a communication session with a communication device based on the communication request; and a server communicatively coupled to the interactive voice response unit, the server being configured to identify a monitoring request from a second communication device and to query a database to determine whether the address information is associated with the monitoring request a switch, wherein the gateway device establishes a connection to route the communication session through the switch and back to the gateway device, wherein the server is configured to forward a switch address of the switch to the database, and wherein the second communication device is configured to monitor and obtain the switch address from the database, to generate a monitoring session request including the switch address, and to forward the monitoring session request to the switch, and wherein the switch establishes a monitoring session for conferencing the second communications device into the communication session based on the monitoring session request.

20. The system of claim 19, wherein the server determines that the monitoring request is associated with the address information if second address information included in the monitoring request matches the address information.

* * * * *